(12) United States Patent
Iyer et al.

(10) Patent No.: US 8,699,418 B2
(45) Date of Patent: *Apr. 15, 2014

(54) BAND STEERING FOR MULTI-BAND WIRELESS CLIENTS

(75) Inventors: Pradeep J. Iyer, Cupertino, CA (US); Keerti G. Melkote, San Jose, CA (US); Partha Narasimhan, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/156,215

(22) Filed: Jun. 8, 2011

(65) Prior Publication Data

US 2011/0235591 A1    Sep. 29, 2011

Related U.S. Application Data

(63) Continuation-in-part of application No. 12/099,680, filed on Apr. 8, 2008, now abandoned.

(51) Int. Cl.
*H04W 4/00* (2009.01)

(52) U.S. Cl.
USPC .......................................................... 370/328

(58) Field of Classification Search
USPC ............. 370/311–339; 455/422.1–426.2, 453
See application file for complete search history.

(56) References Cited

U.S. PATENT DOCUMENTS

| | | | |
|---|---|---|---|
| 5,774,805 A | 6/1998 | Zicker | |
| 5,815,811 A | 9/1998 | Pinard et al. | |
| 6,957,067 B1 | 10/2005 | Iyer et al. | |
| 7,480,264 B1 | 1/2009 | Duo et al. | |
| 7,551,577 B2 | 6/2009 | McRae | |
| 7,558,235 B2 | 7/2009 | Lester et al. | |
| 7,577,453 B2 * | 8/2009 | Matta | 455/509 |
| 7,610,014 B2 | 10/2009 | Buckley | |
| 7,797,018 B2 * | 9/2010 | Chandra | 455/552.1 |
| 2004/0063455 A1 | 4/2004 | Eran et al. | |
| 2004/0125775 A1 | 7/2004 | Rios | |
| 2005/0213579 A1 * | 9/2005 | Iyer et al. | 370/395.2 |
| 2006/0073827 A1 | 4/2006 | Vaisanen et al. | |

(Continued)

OTHER PUBLICATIONS

U.S. Appl. No. 12/099,680, Non-Final Office Action, mailed Feb. 3, 2011.

(Continued)

*Primary Examiner* — Frank Duong
(74) *Attorney, Agent, or Firm* — Varun A. Shah

(57) ABSTRACT

Band steering for multi-band wireless clients. In a wireless digital network having at least one central controller and a plurality of access nodes connected to the central controller, and wherein some of the access nodes support a preferred wireless band and at least one non-preferred wireless band, the central controller identifies wireless client devices capable of multi-band operation, and encourages them to connect to the preferred wireless band. Client devices may be identified as multi-band capable by tracking probe requests. The central controller keeps a list of multi-band capable clients, for example in a database. This information is provided to other central controllers, and to access nodes attached to the central controller. Multi-band capable clients are encouraged to connect on the preferred wireless band for example by having the access nodes not respond to probe requests on the non-preferred wireless bands. Connections made on the non-preferred wireless bands may be moved to the preferred wireless band.

18 Claims, 6 Drawing Sheets

(56) References Cited

U.S. PATENT DOCUMENTS

| | | |
|---|---|---|
| 2009/0252097 A1 | 10/2009 | Iyer et al. |
| 2010/0330914 A1 | 12/2010 | Chandra |
| 2011/0235591 A1 | 9/2011 | Iyer et al. |
| 2012/0243474 A1 | 9/2012 | Iyer et al. |

OTHER PUBLICATIONS

U.S. Appl. No. 12/099,680, Final Office Action, mailed Oct. 25, 2011.

Trapeze Networks, Mobility System Overview, 13 pages, 2004.

* cited by examiner

1200

| MAC<br>1210 | Time of last probe req.<br>1220 | SNR of last probe req.<br>1230 | 5 GHz capable?<br>1240 | 2.4 GHz capable?<br>1250 |
|---|---|---|---|---|
| 00:13:ce:3e:60:bc | Apr 15 21:25:28 | 20 dB | N | Y |
| 00:04:13:21:04:54 | Apr 15 21:27:32 | 35 dB | Y | N |
| 00:0b:86:40:14:e0 | Apr 15 21:27:32 | 15 dB | Y | Y |
| 00:0b:86:64:c7:ae | Apr 15 21:32:07 | 40 dB | Y | Y |
| ⋮ | ⋮ | ⋮ | ⋮ | ⋮ |

BAND STEERING FOR MULTI-BAND WIRELESS CLIENTS

CROSS REFERENCE TO RELATED APPLICATIONS

This application is a continuation-in-part of U.S. patent application Ser. No. 12/099,680, entitled "Band Steering for Multi-Band Wireless Clients," filed on 8 Apr. 2008. Priority to the prior patent application is expressly claimed. This application is related to U.S. patent application Ser. No. 13/098,184, entitled "Signal Strength Aware Band Steering," filed on 29 Apr. 2011. The disclosures of aforementioned patent applications are hereby incorporated by reference in their entirety.

BACKGROUND OF THE INVENTION

The present invention relates to the operation of dual-band wireless digital networks, and to the process of assigning clients in dual-band networks.

Wireless digital networks, such as networks operating under IEEE 802.11 standards, are spreading in their popularity and availability. With such popularity, however, come problems of resource availability and use. While a user of such networks may just think of them as "wireless," those who plan and operate such networks usually have a deeper understanding. In many regulatory domains, such as the United States, channels are available for IEEE 802.11 wireless digital networks in both the 2.4 GHz and 5 GHz bands. More channels are available for use in the 5 GHz band, and therefore more capacity.

Many client devices are capable of operating on both 2.4 GHz and 5 GHz bands; many client devices are also limited to a single band, usually the older 2.4 GHz band.

What is needed are methods of "encouraging" dual-band capable clients to associate with channels in the "preferred" 5 GHz band where available, thus freeing up capacity in the "non-preferred" 2.4 GHz band for single-band clients.

BRIEF DESCRIPTION OF THE DRAWINGS

The invention may be best understood by referring to the following description and accompanying drawings that are used to illustrate embodiments of the invention in which:

FIG. 2 shows a diagram illustrating an example of media access controller (MAC) address list according to one embodiment of the present disclosure.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the invention as claimed.

Overview

Embodiments of the invention relate to band steering for multi-band Wi-Fi clients. In a wireless digital network having one or more central controllers operating a plurality of single and multi-band access nodes where one band is preferred, a central controller identifies multi-band capable clients, and encourages such multi-band clients to connect to the preferred band.

Figure 1:
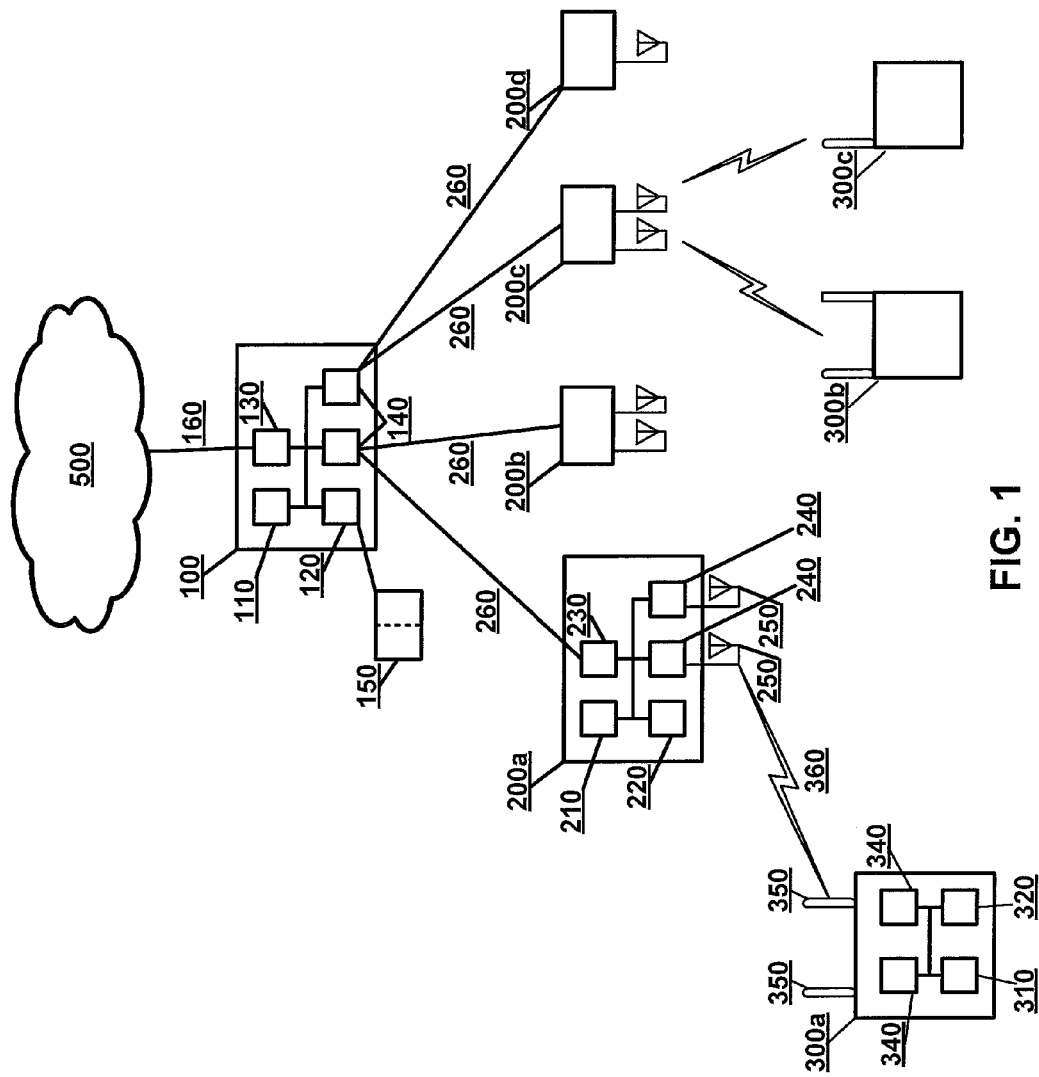
FIG. 1 shows a wireless network.

FIG. 1. shows an environment suitable for practicing the invention. Central controller 100 comprises central processing unit (CPU) 110, which is coupled to memory hierarchy 120, first network interface 130, and second network interfaces 140. Central controller 100 communicates 160 with network 500, which may contain other similar central controllers.

Central controller 100 connects 260 to access nodes 200a, 200b, 200c, 200d. Each access node, generally represented as access node 200, comprises a central processing unit 210 coupled to memory hierarchy 220, first network interface 230, and wireless network interfaces 240. Wireless network interfaces 240 are preferably wireless interfaces operating according to IEEE 802.11 standards, although other standards may be used, such as WiMAX. Where more than one wireless interface 240 is present in an access node, the different interfaces 240 operate using different communication bands and antennas 250. As an example, an access node 200 may have as its first network interface an 802.3 wired Ethernet interface, and as its secondary network interfaces 240 a wireless IEEE 802.11 interface operating in the 2.4 GHz band, and a wireless IEEE 802.11 interface operating in the 5 GHz band. Other embodiments may contain, for example, wireless IEEE 802.11 interfaces, wireless interfaces for the 700 MHz band, and a wireless WiMAX interface.

According to the invention, one communication band is considered the "preferred" band, and the other bands are considered "non-preferred". For the purposes of example, only two bands will be considered. In the case of IEEE 802.11 wireless networks, the 5 GHz band may be considered the preferred band and the 2.4 GHz band considered the non-preferred band. While this consideration may be made on the number of channels available, with more channels available on the 5 GHz band than on the 2.4 GHz band, the determination of which band is preferred among a group of bands may be made on other considerations as well. For example, in some embodiments, this consideration may be based on coverage, on roaming characteristics, or on a desire to keep one band available for single-band only devices.

In central controller 100, CPU 110 is a MIPS-class CPU such as those from Cavium or Raza. CPUs from other manufacturers, such as Intel, AMD, ARM, or the like may also be used. Memory hierarchy 120 as understood by the art may include, but is not limited or restricted to machine readable media that holds instructions and data necessary for practicing the invention. This machine readable media may comprise a small amount of permanent storage for system initialization, fast read-write storage such as DRAM, and bulk storage such as hard disc or Compact Flash for storing files.

Similarly, with respect to access node 200, CPU 210 is a MIPS-class CPU such as those from Cavium or Raza. CPUs from other manufacturers, such as Intel, AMD, ARM, or the like may also be used. Memory hierarchy 220 as understood by the art holds instructions and data necessary for practicing the invention, such as machine readable media described above.

As understood by the art, the hardware platforms comprising central controller 100 and access nodes 200 may operate under control of target software running under a LINUX-variant operating system, or other operating system suitable for embedded devices.

Client devices 300a, 300b, 300c are also digital devices usually comprising CPU 310, memory hierarchy 320, displays, keyboards and the like, and one or more wireless interfaces 340 and antennas 350. Such client devices may range from small handheld units such as Wi-Fi phones having a single wireless interface, such as client device 300c supporting communications over a 2.4 GHz band, or portable computers having wireless interfaces supporting communications over either 2.4 GHz or 5 GHz bands, and possibly WiMAX.

According to an embodiment of the invention, a multi-band wireless network such as that shown in FIG. 1 has a plurality of access nodes connected to at least one central controller. Many of these access nodes support operation on more than one communication band, with one band being preferred for operation over other bands. As an example, for IEEE 802.11 Wi-Fi networks in many regulatory domains, more channels are available in the 5 GHz band, the preferred band according to the invention, than in the 2.4 GHz band, the non-preferred band. When serving multi-band capable clients, such multi-band clients are encouraged to use the preferred band, which also leaves the non-preferred band available for those single-band only clients.

In such a wireless network, it is desirable to uniquely identify client devices. As an example, in IEEE 802.11 networks, devices may be identified by their media access controller (MAC) address. In operation, central controller 100 identifies dual-band capable clients. When a client device is identified as multi-band capable, central controller 100 stores this information in database 150.

A client device, generally represented as client device 300, may be identified as multi-band capable in a number of ways. One way a client device 300 is identified as multi-band capable is recording when an access node 200 receives a probe request on the preferred band, such as the 5 GHz band.

A client device 300 may advertise its capabilities, such as the capability to operate on multiple bands, in probe requests as well. By observing such behavior, and other behaviors such as activity of devices on preferred and non-preferred bands, central controller 100 may further identify and record in database 150 which client devices 300 are multi-band capable.

According to an embodiment of the present invention, as client devices are identified as multi-band capable, this information is stored in a database 150 in central controller 100. Central controller 100 may store this information in a separate database denoting multi-band capability, or it may store this information as a field in an existing database kept by MAC address or other suitable unique client device identifier.

Central controller 100 shares the list of multi-band capable clients with other central controllers on network 500, and with access nodes 200 connected to central controller 100. This information may be pushed out by central controller 100, or it may be pulled out by access nodes 100 and other central controllers 100 on network 500. When a new access node 200 connects to central controller 100, the list of multi-band capable clients is sent to the new access node.

When a central controller receives information identifying a new client device as multi-band capable, it may push this information out to associated access nodes 200 immediately. Alternatively, central controller 100 may hold that information for periodic updates of access nodes 200, or hold the information until requested by access nodes 200.

In another embodiment of the invention, as client devices are identified as multi-band capable, and that information is sent by an access node 200 to central controller 100, central controller 100 resends this information to all access nodes 200, and any other central controllers 100 on network 500. In this manner, a central database is not kept on central controller 100, rather central controller 100 acts as a distribution point, supplying updates to access nodes 200 and other central controllers 100.

Once a client device 200 has been identified as multi-band capable by a central controller such as central controller 100, when client device 200 attempts to connect to an access node 300, it is encouraged to connect to the preferred band. Methods for accomplishing this include not responding to probe requests on the non-preferred band(s), denying association attempts on the non-preferred band(s), and accepting a client on the non-preferred band(s) but then moving such client to the preferred band using techniques such as IEEE 802.11v directed roaming, or by de-authentication and re-authentication.

As an example, if the 5 GHz band is the preferred band, and the 2.4 GHz band is the non-preferred band, when a client device 300 sends a probe request to an access node 200 on a non-preferred band, access node 200 checks its internal database to see if the client device has been identified as multi-band capable. If the client device has been identified as multi-band capable, then access node 200 ignores the probe request on the non-preferred band. When the client device sends a probe request in the preferred band, for example the 5 GHz band, that probe request receives a response, and the client device will connect on the preferred, in this example, 5 GHz band.

In an embodiment of the invention, central controller 100 commands access nodes 200 to scan clients in the background. Such a background scan may identify additional client devices as multi-band capable.

In an embodiment of the invention, when a client device which is connected to the non-preferred band, in this example the 2.4 GHz band, is identified as multi-band capable, the current connection between client device 300 and access node 200 may be maintained, with the client device moving to the preferred band when it next connects, or the client device may be moved from non-preferred to preferred band. In one embodiment, IEEE 802.11v directed roaming may be used. In another embodiment, central controller 100 sends a de-authentication message through the access node 200 to client device 300. When client device 300 re-authenticates, its probe requests to access node 200 will not receive responses, and so client device 300 will attempt to re-authenticate on the preferred band, in this example the 5 GHz band.

Communication Band Channels

WLAN devices, such as access points, use one or more radios and their antennas to send and receive the radio waves, and make small changes to the waves to encode data. WLAN radio waves have a repeating signal that, when graphed over time, shows a repeating periodic waveform characterized by a frequency (the number of times the waveform repeats per second), an amplitude (the height of the waveform), and a phase (the particular point in the repeating waveform). Because many electronic devices radiate energy at varying frequencies, to prevent the energy radiated by one device from interfering with other devices, government agencies (e.g., Federal Communications Commission of the United States, hereinafter "FCC") often enact regulations on the usage of radio frequencies. A communication band may include a range of consecutive frequencies. The wider the range of frequencies in a frequency band, the greater the amount of data that can be sent in that frequency band.

Table 1 below illustrates 2.4 GHz communication band, which includes eleven commonly used band channels in the United States. The first communication channel corresponds to a frequency spectrum from 2.402 GHz to 2.422 GHz with a mid-point frequency of 2.412 GHz. The second communication channel overlaps with the first communication channel, and corresponds to a mid-point frequency of 2.417 GHz. Likewise the third communication channel overlaps with both the first and the second communication channels with an even higher mid-point frequency.

TABLE 1

2.4 GHz band channels unlicensed in the US

| Channel | | | | | |
|---|---|---|---|---|---|
| 1 | 2 | 3 | 4 | 5 | 6 |
| Frequency (GHz) 2.412 | 2.417 | 2.422 | 2.427 | 2.432 | 2.437 |

| Channel | | | | |
|---|---|---|---|---|
| 7 | 8 | 9 | 10 | 11 |
| Frequency (GHz) 2.442 | 2.447 | 2.452 | 2.457 | 2.462 |

There are only three non-overlapping channels in the 2.4 GHz communication band. The three non-overlapping channels are channels 1, 6, and 11. Thus, in a WLAN that operates on the 2.4 GHz communication band, access points are typically configured to transmit data within one of the three non-overlapping channels to reduce interference and to improve transmission quality.

Table 2 below illustrates mid-point frequencies of the twenty-four commonly used channels in the 5 GHz communication band in the United States.

TABLE 2

5 GHz band channels unlicensed in the US

| Channel | Frequency (GHz) |
|---|---|
| 36 | 5.180 |
| 40 | 5.200 |
| 44 | 5.220 |
| 48 | 5.240 |
| 52 | 5.260 |
| 56 | 5.280 |
| 60 | 5.300 |
| 64 | 5.320 |
| 100 | 5.500 |
| 104 | 5.520 |
| 108 | 5.540 |
| 112 | 5.560 |
| 116 | 5.580 |
| 136 | 5.680 |
| 140 | 5.700 |
| 149 | 5.745 |
| 153 | 5.765 |
| 157 | 5.785 |
| 161 | 5.805 |
| 165 | 5.825 |

Therefore, 5 GHz communication bands have more non-overlapping communication channels compared to 2.4 GHz communication bands, which implies less radio congestion and RF interference in the 5 GHz communication bands than in the 2.4 GHz communication band. Moreover, operating at the 5 GHz communication bands is advantageous over operating at the 2.4 GHz communication bands also because the 5 GHz communication bands offer better penetration, better scatter, little abnormal adsorption by water or damp, and possibility of orthogonal frequency-division multiplexing (OFDM) over the entire speed range, and so on.

Identification of Devices Capable of Communicating on Multiple Bands

Given the advantages of different communication bands described above, many wireless client devices now provides capability of communicating on multiple communication bands. For example, some client devices may be equipped with multiple radio antennas that are configured to communicate on both 2.4 GHz and 5 GHz communication bands. Identifying such client devices facilitates guiding the client devices to communicate on a preferred communication band, thereby achieving higher throughput and better quality of connections to the wireless network.

It shall be noted, however, that the preferred communication band from a wireless network client's perspective may be different from the preferred communication band from a wireless network system's perspective. For example, wireless network users often prefer to select a wireless local area network ("WLAN") whose service set identifier ("SSID") is associated with strong wireless response signals. Nevertheless, signal strength is merely one of many factors that may affect wireless connectivity. Other factors can also affect the wireless connectivity for wireless client devices. Such factors may include RF interferences from other electronic devices located within the wireless coverage area, mixture of 802.11b/g network connections with 802.11n network connections, shared bandwidth among multiple users, and so on. It can often be difficult for a wireless client device to acquire knowledge regarding these factors. For example, a wireless user may not know how many other users are presently connecting to a WLAN that is associated with the strongest signal strength. Likewise, a wireless user may not know whether a WLAN associated with strong wireless response signals has recently experienced jitters due to, e.g., intermittent RF interferences. Moreover, a wireless user is unlikely to know whether a WLAN associated with strong wireless response signals is configured to operate in a mixed mode that supports both 802.11b/g network connections and 802.11n network connections. Even for an IEEE 802.11n-based wireless network, a wireless user may not know whether the wireless network is configured to support features, such as channel bounding, in order to maximize the throughput.

Knowledge of the above-described factors, which may impact a wireless client's connectivity and a wireless network's performance, typically can be observed and/or acquired by the wireless network system, for example, at an access point or a wireless controller. Thus, the wireless network system may determine, based on system knowledge about the wireless network which is unknown to the wireless client, that a different communication band, which is not the preferred communication band determined by a wireless client, shall be the preferred communication band for communication with the wireless client. For example, the wireless network system may observe that too many wireless users and/or devices are connected on the 2.4 GHz communication band, and thereby determine that 5 GHz communication band would be a preferred communication band, even though the wireless signals received from a wireless client is slightly weaker on the 5 GHz communication band than the 2.4 GHz communication band.

If a wireless network system can successfully identify client devices that are capable of communicating on the system's preferred communication band, which is different from the client device's preferred communication band, then the wireless network system can guide those client devices to communicate on the system's preferred communication band instead of the client's preferred communication band.

In one embodiment, the wireless network system can identify such client devices by keeping track of their MAC addresses when a wireless signal (for example, a PROBE request) is received on the system's preferred communication band. A MAC address is a unique identifier assigned to a network interface for communications on the physical network segment. Because each MAC address uniquely identifies a network interface card ("NIC") in a client device, the MAC address also uniquely identifies a client device even though the client device may have multiple NICs.

In particular, according to one embodiment of the present disclosure, the system generates and maintains a list in, for example, a memory of an access point, a switch, a network controller, or other kinds of network device. Assuming, for illustration purposes, that 5 GHz communication band is determined to be the system's preferred communication band, when the system receives a Probe Request from a client device on the 5 GHz communication band, the system retrieves the MAC address associated with the client device from the received Probe Request. The system then checks the list to determine whether the retrieved MAC address exists in the list. If so, the system has previously identified the client device as capable of communicating on the system's preferred communication band, and thus will proceed with determining whether to respond or ignore the Probe Request. If, however, the retrieved MAC address from the Probe Request received on the 5 GHz communication band does not exist in the list, the system includes the MAC address to the list, thereby identifying the client device as capable of communicating on the system's preferred communication band, which is assumed by the system to be different from the client's preferred communication band based on the strength of wireless signals received by the system from the client device.

In some embodiments, the system may enhance the list by also tracking the MAC addresses of client devices capable of communicating on, for example, the wireless client's preferred communication bands, or the system's non-preferred communication bands, etc. In one embodiment, the system may generate a separate MAC address list for each communication band. In another embodiment, the system may generate one or more MAC address list, including different fields, each of which corresponds to a specific communication band.

In some embodiments, the system may additionally include a timestamp for each MAC address. The timestamp may corresponds to, for example, the latest Probe Request received on the system's preferred communication bands, on the wireless client's preferred communication bands, on the system's non-preferred communication bands, and/or on the wireless client's non-preferred communication bands, etc.

In some embodiments, the system may further include a signal strength corresponding to the each MAC address. The signal strength can be associated with a signal-to-noise ratio ("SNR") or a dynamic range for example. SNR is generally defined as the power ratio between a signal (meaningful information) and the background noise (unwanted signal). Note that SNR typically measures the ratio between an arbitrary signal level (not necessarily the most powerful signal possible) and noise. On the other hand, dynamic range generally measures the ratio between the strongest un-distorted signal on a channel and the minimum discernable signal, which for most purposes is the noise level.

In some embodiments, SNR can be measured by received signal strength indicator ("RSSI"), which is an indication of the power level being received by the antenna as sampled during the preamble stage of receiving a wireless data frame. In other embodiments, received channel power indicator ("RCPI") is used to indicate the signal strength. RCPI is a functional measurement covering the entire received frame with defined absolute levels of accuracy and resolution.

FIG. 2 shows a diagram illustrating an example of MAC address list according to one embodiment of the present disclosure. In the illustrated example, MAC list 1200 includes MAC addresses 1210 associated with multiple wireless client devices, timestamp of last received Probe Request 1220, SNR of last received Probe Request 1230, a field indicating whether a client device associated with the MAC address is capable of communicating on the system's preferred communication band (such as 5 GHz communication band) 1240, and another field indicating whether the client device is capable of communicating on the system's non-preferred communication band (such as 2.4 GHz communication band) 1250. Note that MAC list 1200 may include other fields to facilitate tracking the client devices' capabilities, preferences, network environments, and so on, without departing from the spirit of the instant disclosure. Also, MAC list 1200 may omit one or more illustrated fields for some or all of the MAC addresses. FIG. 2 is hereby presented for illustrated purposes only and shall not be construed to limit the structure or content of MAC list 1200.

In the example illustrated in FIG. 2, wireless client device 1262 is associated with an MAC address of 00:13:ce:3e:60:bc, and received its latest Probe Request on 2.4 GHz communication band on April 15 21:25:28. The system can also determine from MAC list 1200 that the latest Probe Request received from wireless client device 1262 has a good signal level, because its SNR value is 20 dB, which falls in a pre-determined signal strength range for good signals on the 2.4 GHz communication band. Likewise, wireless client device 1264 is associated with an MAC address of 00:04:13:21:04:54, and received its latest Probe Request on 5 GHz communication band on April 15 21:27:32. Wireless client device 1264 has a good signal level, because its SNR value 35 dB may correspond to a pre-determined range for good signals on the 5 GHz communication band. Note that the ranges for the same level of signal strength may be the same or different on different communication bands. For example, signals with an SNR value of 20 dB may be considered as good on the 2.4 GHz communication band, but may be considered as poor signals on the 5 GHz communication band.

As another example, wireless client device 1266, which is associated with an MAC address of 00:0b:86:40:14:e0, has been identified as capable of communicating on both the 2.4 GHz and the 5 GHz communication bands. The latest Probe Request was received from wireless client device 1366 on April 15 21:27:32 with an SNR value of 15 dB. MAC list 1200 may further include information that associate the latest received Probe Request with the 2.4 GHz communication band. Such information may be included within SNR field 1230, timestamp field 1220, or an additional field in MAC list 1200. Based on information about wireless client device 1266 in MAC list 1200, the system may determine not to guide wireless client device 1266 to the system's preferred communication band (such as the 5 GHz communication band), because the system may infer that wireless client device 1266 could receive even weaker signals on the 5 GHz communication band than on the 2.4 GHz communication band.

As a further example, wireless client device 1268, which is associated with an MAC address of 00:0b:86:6f4:c7:ae, also has been identified as capable of communicating on both the 2.4 GHz and the 5 GHz communication bands. Because the latest Probe Request was received from wireless client device 1268 on April 15 21:32:07 with an SNR value of 40 dB on 2.4 GHz communication band, the system may infer that wireless client device 1268 will receive reasonably good signals on the 5 GHz communication band as well. Therefore, the system will operate to guide wireless client device 1268 from the client's preferred communication band to the system's preferred communication band.

Note that the example provided herein is by way of illustration only. Other implementations of tracking and storing information may be used to accomplish the objective.

Band Steering to Preferred Communication Band

Figure 3A:
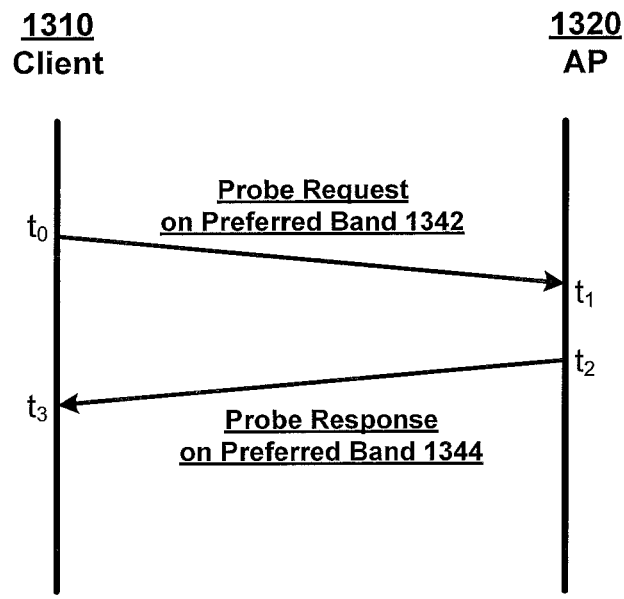
FIGS. 3A-3C are sequence diagrams illustrating band steering for multiple-band wireless clients according to various embodiments of the present disclosure.
Figure 3B:
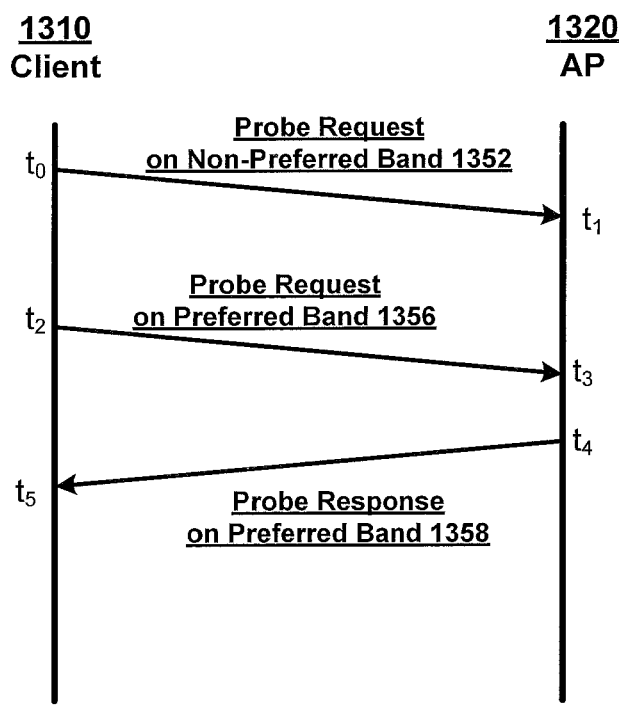
Figure 3C:
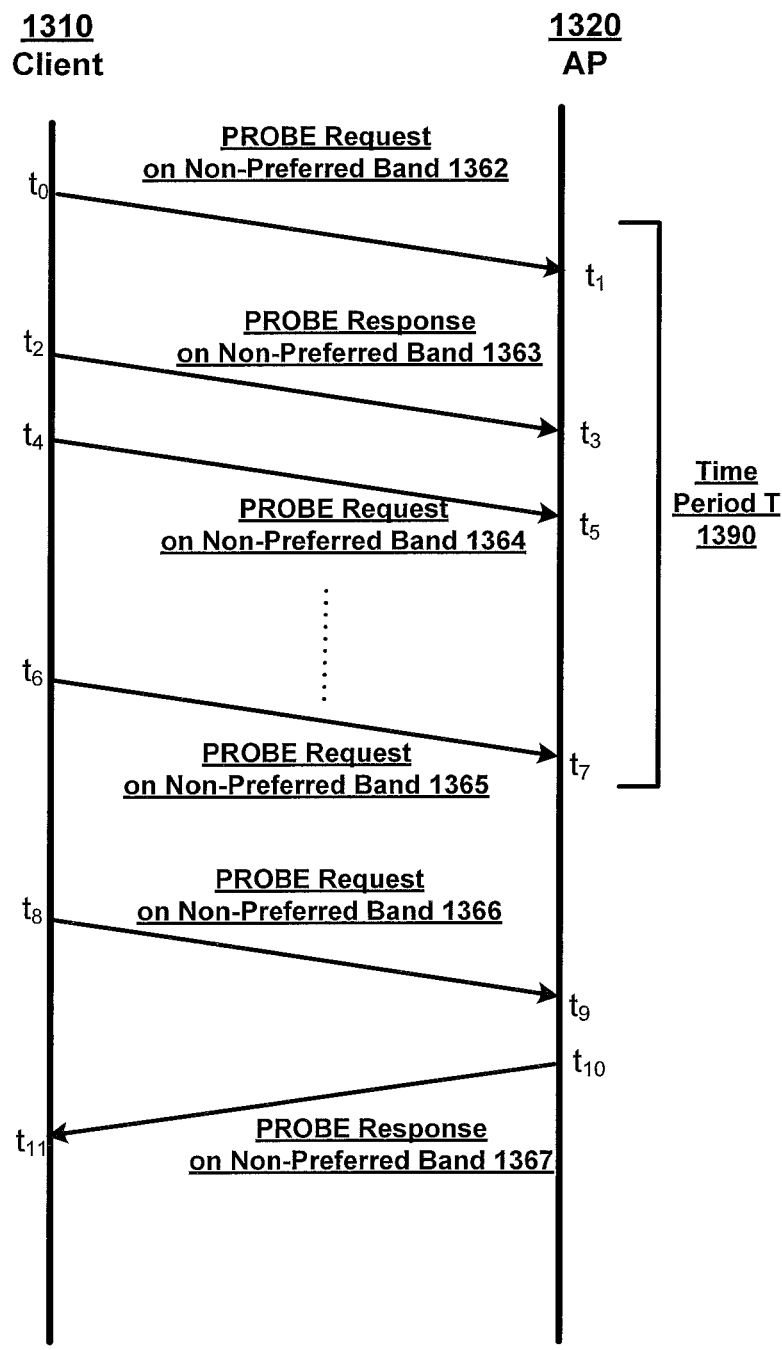

FIGS. 3A-3C are sequence diagrams illustrating band steering for multiple-band wireless clients according to various embodiments of the present disclosure. Communication exchanges in WLAN as illustrated in FIGS. 3A-3C typically involve two parties: client 1310 and access point ("AP") 1320. Note that access point 1320 can be substituted by a controller, a switch, or any other network device, which is coupled to client 1310 through a network, and which is capable of establishing an association with client 1310 via receiving and responding to Probe requests from client 1310. Also, it is contemplated that the disclosure describes an analysis based on receipt of a Probe request, although it is contemplated that this analysis may be conducted for any wireless signaling that requests return signaling.

Specifically, FIG. 3A illustrates a sequence diagram in which access point 1320 receives a wireless signal, such as a Probe Request for example, on a system's preferred communication band 1342 from client 1310. During operations, client 1310 initiates a Probe Request 1342 at time $t_0$. Probe Request 1342 is received by AP 1320 at time $t_1$. After receiving Probe Request 1342 at time $t_1$, AP 1320 determines whether Probe Request 1342 is received in a channel on the system's preferred communication band. In the illustrated example, because Probe Request 1342 is received on the system's preferred communication band, AP 1320 transmits a responsive signal, such as a Probe Response 1344 for example, on the system's preferred communication band at time $t_2$. Probe Response 1344 on the system's preferred communication band is received by client 1310 at time $t_3$, subsequent to which WLAN coupled to AP 1320 will become visible to client 1310 for association.

FIG. 3B illustrates a sequence diagram in which access point ("AP") 1320 receives a Probe request 1352 on a non-preferred communication band from client 1310 at $t_1$. During operations, at time $t_0$, client 1310 transmits a Probe Request 1352 on a client's preferred communication band, which is a system's non-preferred communication band, to AP 1320. Because client 1310 has been identified as capable of communicating on the system's preferred communication band, after AP 1320 receives Probe Request 1352 at time $t_1$, the system will ignore Probe Request 1352, and thereby guiding client 1310 to transmit another Probe Request on the system's preferred communication band instead of the client's preferred communication band. In this example, client 1310 transmits a Probe Request 1356 on the system's preferred communication band at time $t_2$, which is received by AP 1320 at time $t_3$. In response, at time $t_4$, AP 1320 transmits Probe Response 1358 on the system's preferred communication band to client 1310, and Probe Response 1358 is received by client 1310 at time $t_5$.

FIG. 3C illustrates a sequence diagram in which access point ("AP") 1320 receives multiple Probe Requests 1362-1365 on a system's non-preferred communication band from client 1310 within a pre-determined time period T 1390. During operations, at time $t_0$, client 1310 transmits a Probe Request 1362 on a system's non-preferred communication band (or a client's preferred communication band) to AP 1320. Probe Request 1362 is received by AP at time $t_1$. Because client 1310 has been identified as capable of communicating on the system's preferred communication band, after AP 1320 receives Probe Request 1362 at time $t_1$, the system will ignore Probe Request 1362, and thereby guiding client 1310 to transmit another Probe Request on the system's preferred communication band instead of the client's preferred communication band.

However, in this example, client 1310 subsequently transmits multiple Probe Requests on the system's non-preferred communication band, such as, Probe Request 1363 which is transmitted by client 1320 at time $t_2$ and received by AP 1320 at time $t_3$, Probe Request 1364 which is transmitted by client 1320 at time $t_4$ and received by AP 1320 at time $t_5$, . . . . Probe Request 1365 which is transmitted by client 1320 at time $t_6$ and received by AP 1320 at time $t_7$. In one embodiment, because AP 1320 receives multiple Probe Requests 1363-1365 on the system's non-preferred communication band without receiving any request on the system's preferred communication band during a pre-determined time period T 1390, the system infers that client 1310 is persistent on the client's preferred communication band. This can happen, for example, when a client device that is capable of communicating on multiple communication bands has a broken radio antenna that is used to communicate on the system's preferred communication channel. Other client-specific circumstances may also necessitate the client's need to be persistent on communicating on the client's preferred communication band instead of the system's communication band. Therefore, according to one embodiment, after pre-determined time period T 1390 has lapsed, if client 1310 continues to transmit Probe Request (e.g., Probe Request 1366 which is transmitted by client 1310 at time $t_8$ and received by AP 1320 at time $t_9$) on the system's non-preferred communication band, the system will transmit a Probe Response (e.g., Probe Response 1367 which is transmitted by AP 1320 at time $t_{10}$ and received by client 1310 at time $t_{11}$) on the system's non-preferred communication band.

In another embodiment, the system infers that client 1310 is persistent on the client's preferred communication band if AP 1320 receives more than a threshold number of Probe Requests (e.g., Probe Requests 1363-1365) on the system's non-preferred communication band without receiving any Probe Request on the system's preferred communication band. In yet another embodiment, the system draws the inference that client 1310 is persistent on the client's preferred communication band if AP 1320 receives more than a threshold number of Probe Requests within a pre-determined threshold time period T without receiving any Probe Request on the system's preferred communication band.

It is contemplated that the threshold time period or the threshold number of Probe Requests may be determined prior to receiving the Probe Requests, but can be either statically or dynamically determined based on factors, such as network interference level and/or stability, clients' roaming profile and/or mobility, etc. In one embodiment, the disclosed system can adjust to a shorter threshold time period, or a lower threshold number of Probe Requests, when more mobile client devices are observed in the WLAN. In another embodiment, the disclosed system can adjust to a shorter threshold time period, or a lower threshold number of Probe Requests, when the WLAN is regarded as relatively unstable due to RF interferences or other reasons.

Also, note that the threshold time period and/or number corresponding to different communication bands may be different. Moreover, the threshold time period and/or number may depend on the type of communications. Further, threshold time period and/or number can be configurable by a network administrator, or can be dynamically adjusted based on network and/or wireless client profiles.

Band Steering Process

Figure 4:
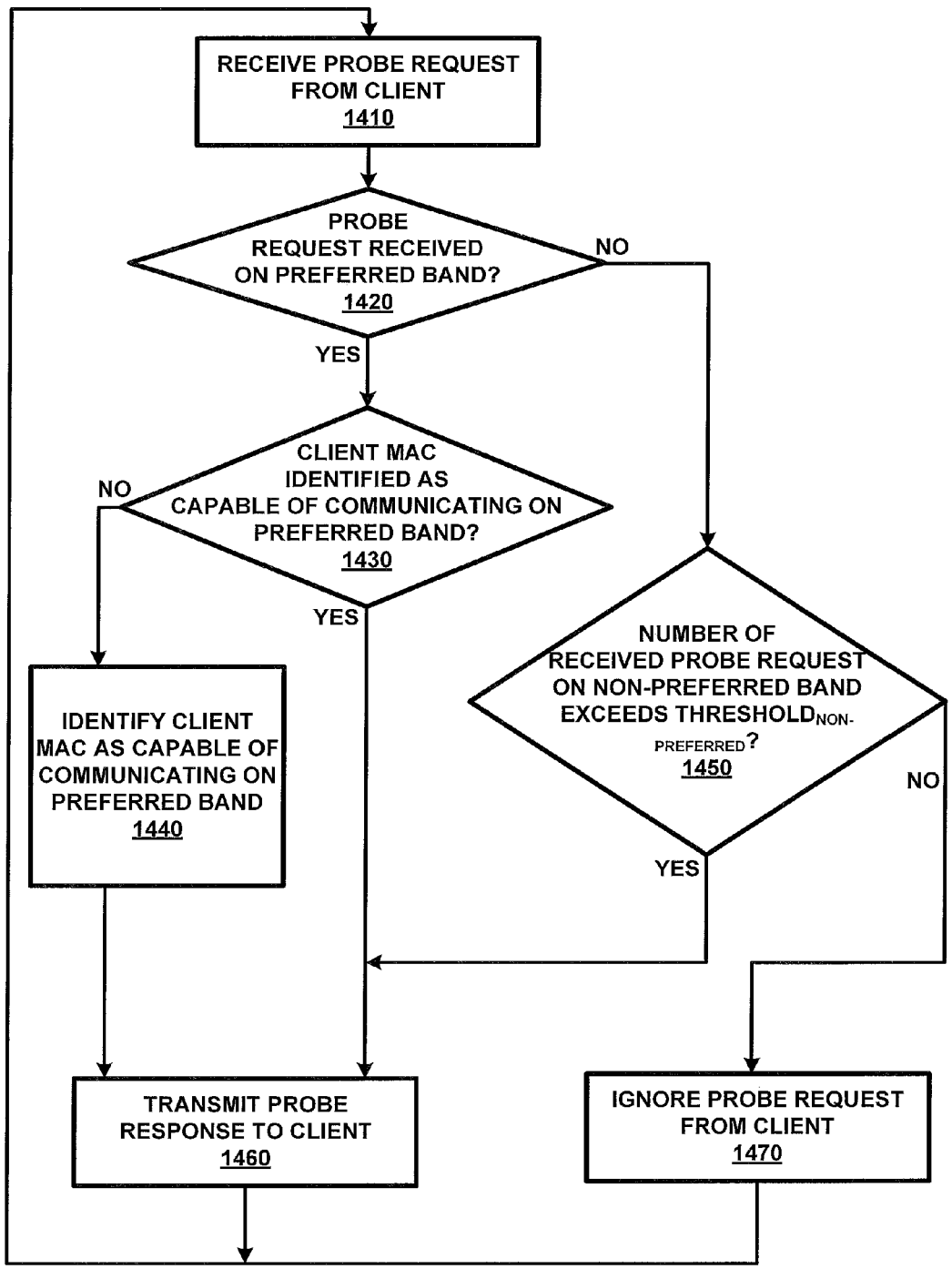
FIG. 4 is a flowchart illustrating the process of band steering for multiple-band wireless clients according to embodiments of the present disclosure.

FIG. 4 is an exemplary flowchart illustrating the process of band steering for multiple-band wireless clients according to an embodiment of the present disclosure. During operations, the disclosed system receives a wireless signal (e.g., a Probe Request) from a client in a WLAN (operation 1410). The system then determines whether the Probe Request is received on a system's preferred communication band (operation 1420). If so, the system further determines whether the client's corresponding MAC address has been identified as capable of communicating on the system's preferred band (operation 1430). As described above in reference to FIG. 2, the system can identify the MAC address by conducting a look-up in a MAC address list that includes MAC addresses associated with client devices from which at least one previous request on the system's preferred communication band has been received. Next, the system transmits a wireless return signal (e.g., a Probe Response) on the system's preferred communication to client (operation 1460).

On the other hand, if the client's corresponding MAC address has not been identified as capable of communicating on the system's preferred communication band, the system will identify the MAC address (operation 1440) accordingly, after receiving the Probe Request on the system's preferred communication band. According to one embodiment, the system makes the identification by including the client's MAC address in an MAC address list, which contains MAC addresses corresponding to devices that have been identified based on previously received wireless request signals.

In one embodiment, if a Probe Request is received on the system's non-preferred communication band, the system next determines whether the number of received Probe Requests on the system's non-preferred communication band time exceeds a pre-determined threshold number for the corresponding non-preferred communication band (operation 1450). In one embodiment, although not shown, the system further determines that no Probe Request has been received on the system's preferred communication band while receiving the Probe Requests on the system's non-preferred communication band. If so, the system will transmit a wireless return signal (e.g., a Probe Response) to the client (operation 1460). Otherwise, the system will ignore the Probe Request from the client (operation 1470), thereby guiding the client to transmit a Probe Request on the system's preferred communication band instead of the client's preferred communication band.

In another embodiment, after receiving a number of Probe Requests on the system's non-preferred communication band without receiving any Probe Requests on the system's preferred communication band, the system determines whether a pre-determined threshold time period has lapsed (not shown). If so, the system will transmit a wireless return signal (e.g., a Probe Response) to the client (operation 1460). Otherwise, the system will ignore the Probe Request from the client (operation 1470), thereby guiding the client to transmit a Probe Request on the system's preferred communication band instead of the client's preferred communication band.

In another embodiment, the system determines whether a pre-determined threshold number of Probe Requests on the system's non-preferred communication band have been received within a pre-determined threshold time period without receiving any Probe Request on the system's preferred communication band (not shown). If so, the system will transmit a wireless return signal (e.g., a Probe Response) to the client (operation 1460). Otherwise, the system will ignore the Probe Request from the client (operation 1470), thereby guiding the client to transmit a Probe Request on the system's preferred communication band instead of the client's preferred communication band.

In some embodiments, the threshold time period and/or the threshold number of wireless request signals (e.g., Probe Requests) can be dynamically adjustable. In some embodiments, the threshold time period and/or the threshold number of wireless request signals (e.g., Probe Requests) are specific to each communication band. Thus, one system's non-preferred communication band may have different threshold values from another system's non-preferred communication band.

Band Steering System

Figure 5:
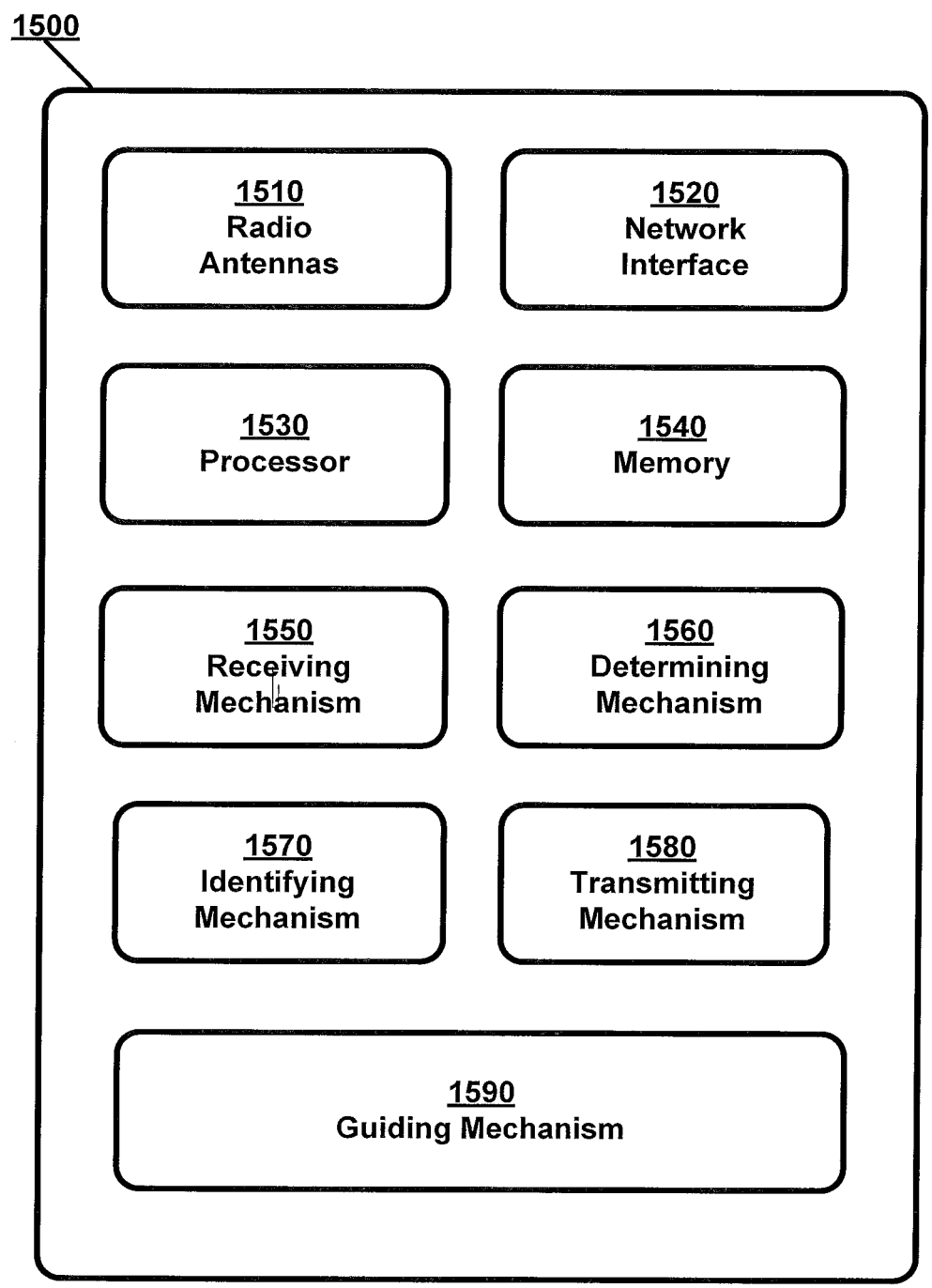
FIG. 5 is a block diagram illustrating a system for band steering for multiple-band wireless clients according to embodiments of the present disclosure.

FIG. 5 is a block diagram illustrating a system for band steering for multiple-band wireless clients according to embodiments of the present disclosure.

Operating as a client device 300 in FIG. 1, network device 1500 includes at least one or more radio antennas 1510 capable of either transmitting or receiving radio signals or both, a processor 1530 capable of processing computing instructions, a network interface 1520 capable of communicating to a wired or wireless network, and a memory 1540 capable of storing instructions and data. Moreover, network device 1500 further includes a receiving mechanism 1550, a determining mechanism 1560, an identifying mechanism 1570, a transmitting mechanism 1580, and a guiding mechanism 1590, all of which are coupled to the processor and the memory in network device 1500. Network device 1500 may be used as a client system, or a server system, or may serve both as a client and a server in a distributed or a cloud networking system.

Radio 1510 may be any combination of known or convenient electrical components, including but not limited to, transistors, capacitors, resistors, multiplexers, wiring, registers, diodes or any other electrical components known or later become known.

Network interface 1520 can be any communication interface, which includes but is not limited to, a modem, token ring interface, Ethernet interface, wireless IEEE 802.11 interface, cellular wireless interface, satellite transmission interface, or any other interface for coupling network devices.

Processor 1530 can include one or more microprocessors and/or network processors. Memory 1540 can include storage components, such as, Dynamic Random Access Memory (DRAM), Static Random Access Memory (SRAM), etc. In one embodiment, memory 1540 stores a unique address identifier associated with a wireless client device in a list, which indicates wireless client devices in the wireless network that are capable of communicating on the first wireless communication band.

Receiving mechanism 1550 receives one or more wireless signals including requests, such as Probe Requests, as describe in the present disclosure.

Determining mechanism 1560 determines whether a wireless communication band is preferred by wireless network and/or wireless client devices. In one embodiment, determining mechanism 1560 determines that the wireless communication band is preferred by the wireless network based on network information known to the system. In another embodiment, determining mechanism 1560 determines that the wireless communication band is not preferred by the wireless network based on network information known to the system. Note that the network information known to the system may include mixed types of network connections, shared bandwidth, radio frequency interferences, wireless network traffic, wireless network latency, wireless network stability, etc. In one embodiment, determining mechanism 1560 determines that another wireless communication band is preferred by a wireless client device. Particularly, determining mechanism 1560 may determine that the wireless client is preferred by the wireless client device based in part on strength of signals received from the wireless client device. Moreover, in one embodiment, determining mechanism 1560 determines that the wireless communication band preferred by the wireless client device is different from the wireless communication band preferred by the wireless network.

Furthermore, in some embodiments, determining mechanism 1560 determines whether an identified unique address identifier already exists in the list. If not, in response, the unique address identifier is stored in the list.

In some variations of the embodiments, determining mechanism 1560 determines whether any request is received within a pre-determined threshold time period from a wireless client device on a wireless communication band that is preferred by the wireless network system. In some variations, determining mechanism 1560 determines whether any request is received from a wireless client device on a wireless communication band that is preferred by the wireless network system, before the number of requests received from the wireless client device on another wireless communication band that is preferred by the wireless client device exceeds a threshold number. In other variations, determining mechanism 1560 determines whether a pre-determined threshold number of requests on the client's preferred communication band are received within a pre-determined threshold time period during which no request is received on the system's preferred communication band.

Identifying mechanism 1570 identifies a unique address identifier associated with a wireless client device based on a request received from the client device.

Transmitting mechanism 1580 transmits a response to a request from a wireless client device. In some embodiments, transmitting mechanism 1580 transmits responses to clients on a system's preferred communication band. In other embodiments, transmitting mechanism 1580 transmits responses to clients on a system's non-preferred communication band. In some embodiments, transmitting mechanism 1580 transmits responses to clients on a wireless client device's preferred communication band. In other embodiments, transmitting mechanism 1580 transmits responses to clients on a wireless client device's non-preferred communication band.

Collectively operating with the determining mechanism 1560 and the identifying mechanism, guiding mechanism 1590 guides wireless client devices capable of communicating on a system's preferred communication band to associate with the wireless network on the system's preferred communication band. In some embodiments, guiding mechanism 1590 ignores a request from the wireless client device received on another communication band that is not preferred by the wireless system. In one embodiment, guiding mechanism 1590 ignores a request from the wireless client device received on another communication band that is preferred by the wireless client device.

The present disclosure may be realized in hardware, software, or a combination of hardware and software. The present invention may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A non-transitory computer readable medium comprising instructions which, when executed by one or more hardware processors, causes performance of operations comprising:
receiving a plurality of probe requests from a client device on a first wireless communication band for a wireless network, wherein the client device is capable of communicating on both the first wireless communication band and a second wireless communication band;
determining whether a number of the plurality of probe requests on the first wireless communication band exceeds a threshold value;
responsive at least to determining that the number exceeds the threshold value, transmitting a probe response on the first wireless communication band; and responsive at least to determining that the number does not exceed the threshold value, refraining from transmitting a probe response on the first wireless communication band.

2. The non-transitory computer readable medium of claim 1, wherein the second wireless communication band is preferred by the wireless network supporting both the first wireless communication band and the second wireless communication band based on network information known to the network device without the network information being known by the wireless client device.

3. The non-transitory computer readable medium of claim 1, wherein the operations further comprises:
transmitting a response to the request from the wireless client device on the first wireless communication band, the second wireless communication band being a preferred wireless communication band by the wireless network, wherein the second wireless communication band preferred by the wireless network is different from the first wireless communication band which is determined to be preferred by the client device but not by the wireless network.

4. The non-transitory computer readable medium of claim 1, wherein the second wireless communication band is determined to be preferred by the wireless client device based at least in part on strength of a signal received from the wireless client device at the network device.

5. The non-transitory computer readable medium of claim 2, wherein the network information known to the network device comprises one or more of:
mixed types of network connections; shared bandwidth; radio frequency interferences; wireless network traffic; wireless network latency; and wireless network stability.

6. The non-transitory computer readable medium of claim 1, further comprising:
determining that the first wireless communication band is not preferred by the network device supporting both the first wireless communication band and the second wireless communication band based on network information known to the network device;
determining that no request is received within a pre-determined time period from the wireless client device on a second wireless communication band that is preferred by the wireless network; and
transmitting a response to the request from the network device to the client device on the first wireless communication band being a preferred wireless communication band for the client device and a non-preferred wireless communication band for the wireless network.

7. The non-transitory computer readable medium of claim 6, further comprising:
determining that the number of subsequent requests received from the wireless client device on the second wireless communication band preferred by the client device exceeds a threshold.

8. The non-transitory computer readable medium of claim 7, wherein the threshold or the pre-determined time period is dynamically adjustable.

9. The non-transitory computer readable medium of claim 1, wherein transmitting the probe response on the first wireless communication band is further responsive to not receiving any probe requests from the client device on the second wireless communication band during the time period during which the plurality of probe requests were received on the first wireless communication band.

10. A non-transitory computer readable medium comprising instructions which, when executed by one or more hardware processors, causes performance of operations comprising:
receiving a plurality of probe requests on a first wireless communication band from a client device, wherein the client device is capable of communicating on both the first wireless communication band and a second wireless communication band;
determining whether a period of time between the first and the last of the plurality of probe requests on the first wireless communication band exceeds a threshold value;
responsive at least to determining that the period of time exceeds the threshold value, transmitting a probe response on the first wireless communication band; and
responsive at least to determining that the period of time does not exceed the threshold value, refraining from transmitting a probe response on the first wireless communication band.

11. The non-transitory computer readable medium of claim 10,
wherein the second wireless communication band is a preferred wireless communication band by the wireless network, and
wherein the second wireless communication band preferred by the wireless network is different from the first wireless communication band which is preferred by the client device but not by the wireless network.

12. The non-transitory computer readable medium of claim 10, wherein transmitting the probe response on the first wireless communication band is further responsive to not receiving any probe requests from the client device on the second wireless communication band during the period of time.

13. The non-transitory computer readable medium of claim 10, wherein the threshold value or the period of time is dynamically adjustable.

14. A non-transitory computer readable medium comprising instructions which, when executed by one or more hardware processors, causes performance of operations comprising:
receiving at least one probe request on a first wireless communication band from a client device, wherein the client device is capable of communicating on both the first wireless communication band and a second wireless communication band;
determining whether a probe request has been received on a second wireless communication band from the client device within a particular period of time;
responsive to determining that no probe request has been received on the second wireless communication band from the client device within the particular period of time, transmitting a probe response to the client device on the first wireless communication band; and
responsive to determining that a probe request has been received on the second wireless communication band from the client device within the particular period of time, refraining from transmitting the probe response to the client device on the first wireless communication band.

15. The non-transitory computer readable medium of claim 14, wherein the operations further comprise:
responsive to determining that the probe request has been received on the second wireless communication band, transmitting a probe response to the client device on the second wireless communication band.

16. The non-transitory computer readable medium of claim 14, wherein the operations further comprise:
wherein transmitting the probe response on the first wireless communication band is further responsive to not receiving any probe requests from the client device on the second wireless communication band during the period of time.

17. The non-transitory computer readable medium of claim 14,
wherein the second wireless communication band is a preferred wireless communication band by the wireless network, and
wherein the second wireless communication band preferred by the wireless network is different from the first wireless communication band which is preferred by the client device but not by the wireless network.

18. The non-transitory computer readable medium of claim 14, wherein the threshold value or the period of time is dynamically adjustable.

* * * * *